United States Patent Office 3,631,151
Patented Dec. 28, 1971

3,631,151
PROCESS FOR THE MANUFACTURE OF THERMO-SETTING SYNTHETIC RESINS COMPRISING CONDENSING AN OPEN CHAIN ARYL BORATE WITH FORMALDEHYDE
Franz Josef Huster, Troisdorf, Germany, assignor to Dynamit Nobel A.G., Troisdorf, Germany
No Drawing. Continuation-in-part of applications Ser. No. 523,027, Jan. 26, 1966, Ser. No. 706,714, Feb. 16, 1968, Ser. No. 838,043, June 24, 1969, and Ser. No. 143,995, Sept. 28, 1969. This application July 13, 1970, Ser. No. 54,601
Claims priority, application Germany, Sept. 30, 1960, D 34,395
Int. Cl. C08g 5/06, 33/18
U.S. Cl. 260—51 R
8 Claims

ABSTRACT OF THE DISCLOSURE

Novel mixed aryl borates of the general formula $BO_x(OAr)_y$, wherein $x$ is greater than 0 but less than 1 and $y$ is less than 1, which mixture contains open chain aryl borates of the formula:

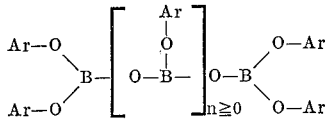

which mixed aryl borates are made by reacting less than 3 mols of a phenolic compound per boron atom with boric acid or boric oxide at elevated temperatures and for extended periods of time sufficient to condense the boron compound and the phenolic compound and cause water as well as phenolic compound to be condensed out of the reaction and removed therefrom. These mixed aryl borates are reactable with formaldehyde or formaldehyde yielding materials to produce thermo-setting resins of the phenol-aldehyde type containing boron therein.

---

This application is a continuation-in-part of application S.N. 143,995, filed Sept. 28, 1969, now abandoned, application S.N. 523,027, filed Jan. 26, 1966, now abandoned, and application S.N. 706,714, filed Feb. 16, 1968, now abandoned, and application S.N. 838,043, filed June 24, 1969, and now abandoned.

The present invention relates to a process for the manufacture of thermosetting plastics containing boron, characterized by condensing mixtures of aryl borates of the general formula $BO_x(OAr)_y$, in which the ratio of boron to aryl radical can be one less than three but more than one, with formaldehyde or substances yielding formaldehyde, in the presence of solvents if desired.

It has long been known in the prior art to condense phenol with formaldehyde to form phenolic resins. By the selection of the catalyst, it is possible to manufacture either novolaks or resols, which can be hardened into highly cross-linked infusible products. In these reactions, alkylated phenols or polyvalent phenols can be used instead of phenol. In order that the reaction may take place smoothly, it is necessary that the phenolic hydroxyl group remains open, i.e., that it be neither etherified nor esterified. Processes have also recently become known in which phenolic ethers or phenolic esters can be made to react with formaldehyde. These reactions, however, take place much more slowly than the recation of phenols having an open hydroxyl group. The reaction occurs in the presence of strongly acid catalysts and yields novolaks.

It is an object of the present invention to provide a new class of synthetic boron containing resins and methods for their manufacture. It is a further object of this invention to provide a new class of synthetic resins by a condensation reaction with formaldehyde and its equivalents and aryl borate compounds containing more than one boron atom per molecule.

It has now been found that mixtures of aryl borates of the general formula $BO_x(OAr)_y$, wherein Ar is an aryl radical, which may be substituted if desired, and $x$ is greater than 0 but less than 1, and $y$ is less than 3 but greater than 1, can be condensed advantageously with formaldehyde or substances yielding formaldehyde, to form thermosetting plastics. These plastics can be transformed to duroplasts by the methods well known in the phenol formaldehyde resin art. In the case of the initial aryl borates having values of $y$ of less than 3 and greater than 1, they may be mixtures containing open-chained aryl borates of the following formula:

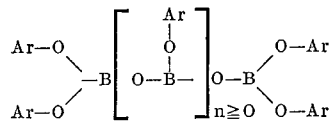

The thermal stability of these aryl borates when transposed with formaldehyde is substantially determined by the ratio of aryl radical to boron: the lower the ratio of aryl radical to boron, the greater is the thermal stability. But the smaller the proportion of the aryl radical to boron, the greater is the viscosity of the condensed aryl borates in the fused state. In this case, the condensation of the aryl borates can be performed advantageously in solvents.

The aryl borates that can be reacted according to the invention can best be described by the general formula $BO_x(OAr)_y$, Ar can be mono- or polysubstituted, the substituents being halogens such as fluorine and chlorine, and bromine and iodine where steric hindrance is not caused thereby, alkyl radicals having up to 12 carbon atoms (e.g., methyl, ethyl, i-propyl, n-propyl, tertiary butyl, nonyl and dodecyl radicals) and low alkoxy radicals. By low alkoxy radicals are meant those which have up to 4 carbon atoms (such as methoxy, ethoxy, propoxy, butoxy and their isomers, e.g., i-propoxy, i-butoxy and the like, and other such radicals). The above formula, however, by no means signifies that only one boron atom is contained in the molecule per molecule of alkyl borate, but that the average sum formula $B_aO_{ax}(OAr)_{ay}$ of a mixture is divided by the average number of boron atoms a present. This formula can also be considered as a ratio which gives the number of aryloxy groups per boron atom. The index of 0 multiplied by 2 expresses how many additional boron atoms on the average are combined with one boron atom. Since $x$ and $y$ are combined with one another by the equation $2x+y=3$, the value of $x$ can run from more than 0 to less than 1, and the values of $y$ from less than three to more than 1.

In the aryl borates preferentially used, the indices for $x$ run from more than 0.75 to less than 1, and accordingly for $y$ from more than 1 to less than 1.5.

The reaction of the above-described aryl borates with formaldehyde or formaldehyde-yielding substances takes place at elevated temperature. The reaction can be accelerated by appropriate catalysts (e.g. hexamethylene tetramine, diethylene triamine etc.). Formaldehyde-yielding substances within the meaning of the invention, but not limited thereto, are paraformaldehyde, trioxane and tetroxane, as well as the hemiformals made of $CH_2O$ and primary or secondary alcohols (e.g., cyclohexanol hemiformal), which can be cleaved thermally or under the influence of a catalyst to yield formaldehyde while some of the alcohol that is split off may function as a solvent for conducting the condensation reaction. Suitable catalysts for the cleavage of the above-named formaldehyde-yielding substances are, for example, hexamethylene tetramine, Lewis acids, $B_2O_3$, $P_2O_5$, pyrophosphoric acid, phosphoric acid, and mixtures of same. Instead of the above-named formaldehyde-yielding substances, low-molecular polymethylol compounds of phenols, (e.g., trimethylol phenol), urea, melamine and other such substances can also be used. Formaldehyde or formaldehyde-yielding substances can be used in such quantities that no more than $z$ mols of formaldehyde or of split off formaldehyde from formaldehyde-yielding substances are used per mol of aryl radical, $z$ being the average number of positions which can react with formaldehyde. The use of $0.2$–$0.3z$ mols of formaldehyde reacted resemble the resol-type of resins. The aryl borates used for the manufacture of the borous thermosetting plastics must contain 2 or 3 phenolic radical positions which can react with formaldehyde, which are unblocked or unsubstituted ortho- and para-positions. It is not necessary, however, that all phenolic radicals contain reactive positions. For the property of hardenability, it is sufficient if at least 2 reactive positions are made to react with formaldehyde per mol of aryl borate.

The reactive aryl borate of the empirical formula $BO_x(OAr)_y$ set forth above can be prepared by condensing boric acid or boric oxide with a suitable phenolic compound or a mixture of phenolic compounds in a reactant mol ratio such that there are less than 3 mols of phenolic compound per boron atom. The condensation is carried out at a temperature and for a time sufficient to remove substantially all of the water of condensation and thereafter to further remove additional condensate which constitutes one or more of the original phenolic reactants of the system. While not being bound to any particular mechanism of reaction, it is believed that the phenolic compound and the boron compound reactants react together to form mixed aryl borates having 1, 2 or 3 phenolic substituents per boron atom. Thus a mixture of mono, di- and/or tri-aryl borates is present upon the removal of condensate water in an amount which is the molar equivalent of the amount of phenolic compound initially charged. The reaction is then continued under such conditions and for such time as to evolve phenolic compound therefrom which, it is postulated, results from a condensation between monomeric aryl borates, probably between a mono-, a di-aryl borate and a tri-aryl borate, whereby splitting out a phenol and condensing the two aryl borates together to form a linear oligomer. The longer the reaction is carried out, the more phenol is split out, and the longer the oligomeric chains become. It will be appreciated that this oligomerization is similar to other oligomerizations in that the oligomers produced are not of uniform chain length but rather have a statistical variation in chain length. Similarly it should be noted that the mono-, di-, and/or tri-aryl borate monomers initially produced in the condensation reaction hereof have no predetermined relative proportion with respect to each other, but rather have a statical distribution dependent upon the reaction conditions and the relative proportions of phenolic compound and boron compound initially charged. It is to be known, however, that since under no circumstances less than 3 mols of phenolic compound are used per boron atom, the initial monomeric aryl borate mixture must, after all condensate water has been removed, have some proportion of at least two different aryl borates (the difference being in the number of aryl substituents per boron atom).

In the production of mixed aryl borate reactants of this invention, it is preferred that the condensation be carried out at a temperature of about 40 to 300° C., whereby during the condensation the temperature increases up to 300° C. for a time varying from about 5 to 40 hours in order to produce the desired mixed aryl borate.

The condensation of the aryl borates with formaldehyde or formaldehyde-yielding substances can, according to the present method, be performed in one or more stages. In the one-stage procedure, it is preferable to commence the reaction in the 20–50° C. range, and slowly and continuously to raise the temperature to about 100° C., the rate at which the temperature is raised depending on the size of the batch and the reactiveness of the phenolic radicals.

In addition to the one-stage performance of the reaction, the present process can also be performed in a plurality of stages, preference being given to the two-stage process. These stages can be referred to as the condensation phase and the preliminary hardening phase. In the two-stage process, aryl borate is made to react with formaldehyde etc. first at room temperature or at a temperature ranging from about 40 to 80° C., preferably between 50 and 60° C. Aryl borates, which are desirably reacted with formaldehyde-yielding substances at room temperature, are best subjected to a preliminary treatment to lower their melting point. This can be done by first adding to the fused aryl borate about $\frac{1}{10}$ to $\frac{1}{20}$ of the amount of formaldehyde needed for the condensation, in the form of paraformaldehyde or trioxane. The product obtained remains liquid when it cools, and it can then be condensed with formaldehyde even at low temperature. Although the rate of condensation in this temperature range is relatively slow, it may be advantageous for the technical application involved.

The aryl borate-formaldehyde condensation product is then subjected in the second reaction phase to a preliminary hardening. This preliminary hardening is best performed in a temperature range of about 80 to 100° C., although higher or lower temperatures can also be used for the purpose. At higher temperatures, however, the preliminary hardening is difficult to control, whereas at low temperatures the uncatalyzed preliminary hardening generally takes place too slowly for an industrial process. The preliminary hardening can be accelerated at low temperatures also by the addition of catalysts such as hexamehylene tetramine.

The reaction of the above-described aryl borates with formaldehyde etc. can, of course, also be performed in the presence of solvents. For this purpose, the aromatic hydrocarbons such as benzene, toluene, xylene etc. have proven particularly well suited.

The resins manufactured by the present process resemble to a great extent the phenol-formaldehyde resins as regards the ways in which they are used. They are soluble in low-boiling alcohols and can be mixed with known fillers, asbestos, powdered stone, glass fibers and fabrics, wood fiber, cellulose fiber, textile fibers and fabrics, etc.), dyes, pigments (iron oxides, chrome yellow, zinc yellow and green, cadmium yellow and red, lithopone, titanium dioxide, molybdate red, carbon blacks), and the additives customary in the pastic molding art. The hardening can be achieved in known manner as used for phenolformaldehyde resins, i.e., at temperatures ranging from 150 to 200° C., with or without the addition of hardeners.

The resins manufactured according to the invention are components for valuable molding and coating compositions, which can be used directly and also with the above-mentioned additives for the manufacture of flame-resistant molded articles, abrasive grinding wheels, brake linings, and generally are used in the same manner as the phenol-formaldehyde resins.

The resins manufactured according to the invention possess excellent thermal stability in the hardened state. A molding compound made in a prior-art manner comprising asbestos and the resin prepared according to the invention shows after 100 hours of storage at 260° C. no loss in mechanical characteristics, but an actual improvement. After 50 hours of storage at 340° C., the bending strengths and impact toughness of the hardened borous resin-asbestos compositions are even greater than the standard values of standard phenolic resin-asbestos molding compositions that have not been stored at such heat. Furthermore, molded pieces can be heated for several hours at as high as 400° C. without the occurrence of bubbles or cracks.

The borous resins of the invention may be mixed with resins of known type, such as those made on the basis of phenols, melamine, urea, aryl borates, etc., or their resinous precursors, e.g., phenol, aryl borates, urea, etc., may be mixed and reacted in common with formaldehyde and/or its equivalents.

The following non-limiting examples are given as illustration of certain preferred embodiments of the novel method and composition and are not to be construed as narrowing the scope of the invention in any manner.

EXAMPLE I

Production of the starting material

Two mols of phenol and one mol of boric acid are kept for about 10 hours at 190° C., while water and a small amount of phenol are carried off through an appropriate column. The main part of the boiling phenol is fed back into the reaction mixture. Then the temperature is slowly raised to 280° C. over a period of 16 hours, whereupon additional amounts of water and excess phenol passed over.

One hundred part of the product thus obtained, having the sum formula $BO_{0.75}(OC_6H_5)_{1.5}$, are then softened at 90° C., and 33.2 parts of paraformaldehyde (molar ratio 1:1.2) are added in portions, while the reaction mixture is kept at 50 to 60° C. After the addition of the paraformaldehyde is completed, the mixture is slowly heated to 90 to 100° C. and left at this temperature until the desired degree of condensation is achieved. Analysis of the starting material: $B=6.7\%$; aryloxy$=85.9\%$; molecular weight 670.

EXAMPLE II

Ten mols of boric acid and 25 mols of phenol are kept for about 30 hours up to 280° C., while water in the form of a water-phenol-mixture is carried off through an appropriate column. The reaction of esterification begins only at about 140° C.; for this reason, heating up to this temperature must be effectuated within a short time. The main part of the distillate passes between 140° and 200° C. The conversion of phenol depends mainly on the velocity of heating up the mixture of phenol/boric acid and the rate of reflux within the temperature range of 140° C. to 200° C. Above 200° C., mainly the free OH-groups of the boric acid are intermediary condensed, whereby water is liberated, which causes once more liberation of phenol. For this reason, the velocity of distillation above 200° C. influences the composition of the reaction product. When the temperature of 280° C. is reached and when the distillation is finished, the remaining reaction product is practically free of OH-groups.

In the foregoing example, 25.1 mols of water and 4.8 mols of phenol were distilled within 30 hours. The residue has the sum formula $BO_{0.49}(OC_6H_5)_{2.02}$.

Seven hundred ninety-one grams of $BO_{0.49}(OC_6H_5)_{2.02}$ produced as indicated hereinbefore, and 240 g. of paraformaldehyde are slowly heated with stirring. At about 45° C., an exothermic dissolving process commences, which causes the internal temperature to rise to 74° C. after removal of the heat source. A grey-green liquid of low viscosity is formed. After the end of the dissolving process, the external heating is resumed and the temperature cautiously raised to 110–120° C. A color change to bright yellow then occurs, accompanied by an increase in viscosity. After two hours, the now highly viscous product is poured into an open dish in which it hardens to a pulverizable mass upon cooling. Analysis of the starting material: $B=5.27\%$; aryloxy$=90.93\%$ molecular weight 420.

The resin thus made is soluble in methanol and is admixed with asbestos and formed into molding compounds in a prior-art manner. Equivalent fillers may be used in addition to, or as a substitute for, asbestos.

EXAMPLE III

Twenty-five grams of $BO_{0.35}(OC_6H_4 \cdot CH_3)_{2.30}$ (prepared from one mole of boric acid and 2.5 moles of m-cresol) similar to Example II, made by condensing up to 280° C. for 30 hours, whereby 0.55 mole of water and 0.2 mol of m-cresol distilled off are heated with 6.8 g. of paraformaldehyde with stirring, whereupon the paraformaldehyde goes completely into solution. From the amount in which the solution is clear and faintly yellowish, the temperature is kept at 100° C. for about another half-hour.

Analysis of the starting material: $B=4.15\%$; aryloxy $=93.72\%$.

After cooling, the resin is pulverized and processed into thermosetting molding compounds, as in Example I.

EXAMPLE IV

Two hundred three grams of a mixed phenyl borate of the sum formula $BO_{0.66}(OR'_1OR''_{0.68})$ ($R''=-C_6H_4 \cdot C_4H_9$; $R'=-C_6H_5$), made by esterification of 2 moles of boric acid and a mixture of 3 moles of phenol and 1.5 moles of p-tertiary butylphenol, similar to Example II, up to 280° C. for 20 hours, are fused at about 100° C. After the addition of 5 g. of paraformaldehyde, the composition is cooled to 60° C. Additional paraformaldehyde (totaling 59.8 g.) is added in such a manner that the temperature of the reaction mixture does not exceed 70° C. After the addition of paraformaldehyde is completed, the resultant composition is heated to 95–100° C. and kept at this temperature until the desired degree of condensation is achieved.

EXAMPLE V

The method of Example IV is repeated with the exception that instead of the p-tertiary butylphenoxy group mentioned therein, a p-nonylphenoxy group is substituted therefor in the mixed phenyl borate. A phenyl borate of this kind is resinified with formaldehyde in the same manner as described in Example IV.

EXAMPLE VI

Two hundred grams of phenyl borate of the sum formula $BO_{0.5}(OR'_{1.5}OR'''_{0.5})$ ($R'=C_6H_5$; $R'''=C_6Cl_5$) made by esterification of one mole of boric acid and a mixture of 2 moles of phenol and 0.6 mole of pentachlorphenol according to Example I, up to 280° C. for 20 hours, are fused at about 100° C. and then cooled to 80° C. At this temperature, 37.2 g. of paraformaldehyde are added with stirring. The composition is then slowly heated to 100° C. and condensed to the desired degree. The condensation product is used as a molding composition, as described in Example I.

EXAMPLE VII

Two hundred grams of a phenyl borate of the sum formula $BO_{0.5}(OR'_{1.5}OR^{IV}_{0.5})$ ($R'=C_6H_5$) ($R^{IV}=C_6H_4 \cdot OCH_3$), made by esterification of one mole of boric acid and a mixture of 2 moles of phenol and 0.6 mole of p-methoxyphenol, similar to Example II, up to the end-temperature of about 280° C. for 20 hours, are fused at about 100° C., and then cooled to 80° C. At this temperature, the calculated amount of paraformaldehyde is slowly stirred in. The mixture is then slowly heated to 100° C. and condensed on to the desired degree. The resultant resin is converted into thermosetting molding compounds.

EXAMPLE VIII

Example VII is repeated, except that, in place of paraformaldehyde, an equivalent amount of trioxane is used.

EXAMPLE IX

Example VII is repeated, except that the reaction is performed in 300 cubic centimeters of xylene.

EXAMPLE X

Example IX is repeated, except that instead of the paraformaldehyde, an equivalent amount of gaseous formaldehyde is introduced into the solution. Otherwise the reaction is performed in the same manner as described.

EXAMPLE XI

Nineteen grams of paraformaldehyde are added to a melt of 200 grams of a phenyl borate of the sum formula $BO_{0.8}(OC_6H_5)_{1.4}$, prepared from 2 moles of boric acid and one mole of phenol in a manner similar to Example I, made by esterification up to 280° C. for 10 hours, with stirring within 40 min. at a temperature raising from 90–110° C. After a short heating to 160° C. the remaining paraformaldehyde (19 grams) is added at 90°–110° C. Then the reaction mixture is heated to 175–180° C. and the distillable products removed under vacuum. The resulting distillate amounted to 5.19 grams. Loss during drying (1.5 hours, 150° C.): 2.8%.

EXAMPLE XII

Example XI is repeated, except that, in place of paraformaldehyde, the same amount of trioxane is used. The resulting distillate amounted to 5.8 grams. Lost during drying (1.5 hours, 150° C.): 0.8%.

Thus, there has been disclosed and described a method for the manufacture of thermosetting synthetic resins by the condensation of aryl borates and alkaryl borates and mixtures thereof with formaldehyde or formaldehyde-yielding compounds. The product obtained thereby comprises a novel condensation resin analogous to the phenol-formaldehyde thermosetting resins known in the art. The resins prepared according to the method of the invention are useful in the same applications as phenol-formaldehyde type resins, i.e., the resinous materials of the present invention may be used as molding compositions, coating compositions, laminating compositions, as binders for brake linings and as binders in abrasive grinding wheels.

Although the present invention has been described with reference to certain preferred embodiments, it is not intended that the novel composition and method be limited thereby, but that certain modifications are included within the broad scope of the following claims.

What is claimed is:

1. A thermosetting resin which is the condensation product at elevated temperatures of at least one member of the group consisting of formaldehyde and formaldehyde yielding substances and mixed aryl borates of the sum formula $BO_x(OAr)_y$, wherein Ar is at least one member selected from the group consisting of phenol and alkyl substituted phenols, $x$ is greater than 0 and less than 1, and $y$ is greater than 1 and less than 3, and $2x+y=3$, which aryl borates contain at least one open chain aryl borate of the formula

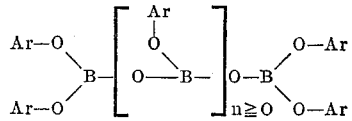

wherein Ar is the same as set forth above.

2. Thermosetting resins as claimed in claim 1, wherein $x$ is 0.75, $y$ is 1.5, and Ar is phenol.

3. Thermosetting resins as claimed in claim 1, wherein $x$ is 0.49, $y$ is 2.02 and Ar is a phenol.

4. Thermosetting resins as claimed in claim 1, wherein $x$ is 0.35, $y$ is 2.30 and Ar is m-cresol.

5. Thermosetting resins as claimed in claim 1, wherein the mixed aryl borates have the sum formula $$BO_{0.66}(OC_6H_4\text{—}C_4H_9)_1(C_6H_5)_{0.68}$$

6. Thermosetting resins as claimed in claim 1, wherein the mixed aryl borates have the sum formula $$BO_{0.5}(OC_6H_5)_{1.5}(OC_6Cl_5)_{0.5}$$

7. Thermosetting resins as claimed in claim 1, wherein the mixed aryl borates have the sum formula $$BO_{0.5}(OC_6H_5)_{1.5}(OC_6H_4\text{—}OCH_3)_{0.5}$$

8. Thermosetting resins as claimed in claim 1, wherein the mixed aryl borates have the sum formula $$BO_{0.8}(OC_6H_5)_{1.4}$$

References Cited

UNITED STATES PATENTS

| | | | |
|---|---|---|---|
| 2,623,866 | 12/1952 | Twiss et al. | 260—37 |
| 3,099,677 | 7/1963 | Hunter | 260—462 |
| 3,290,352 | 12/1966 | Marchand et al. | 260—462 |
| 3,427,283 | 2/1969 | Huster | 260—51 |
| 3,494,892 | 2/1970 | Huster | 260—51 X |

HOWARD E. SCHAIN, Primary Examiner

U.S. Cl. X.R.

260—17.2 R, 33.4 R, 33.6 R, 38, 838, 839, 840, 53 R, 57 R

UNITED STATES PATENT OFFICE
CERTIFICATE OF CORRECTION

Patent No. 3,631,151             Dated   December 28, 1971

Inventor(s) Franz Josef Huster

It is certified that error appears in the above-identified patent and that said Letters Patent are hereby corrected as shown below:

Col. 3, line 71

"40" should be -- 140 --.

Signed and sealed this 2nd day of January 1973.

(SEAL)
Attest:

EDWARD M. FLETCHER, JR.            ROBERT GOTTSCHALK
Attesting Officer                  Commissioner of Patents